US008678942B2

(12) United States Patent
Zhang (10) Patent No.: US 8,678,942 B2
(45) Date of Patent: Mar. 25, 2014

(54) ADJUSTABLE CANOPY MECHANISM AND AN INFANT CARRIER DEVICE HAVING THE SAME

(75) Inventor: Da-Liang Zhang, Taipei (TW)

(73) Assignee: BP Children's Products HK Co., Limited, Kowloon (HK)

( * ) Notice: Subject to any disclaimer, the term of this patent is extended or adjusted under 35 U.S.C. 154(b) by 231 days.

(21) Appl. No.: 13/195,271

(22) Filed: Aug. 1, 2011

(65) Prior Publication Data
US 2012/0034985 A1 Feb. 9, 2012

(30) Foreign Application Priority Data
Aug. 3, 2010 (CN) .......................... 2010 1 0246667

(51) Int. Cl.
*A63G 9/00* (2006.01)
*A63G 9/16* (2006.01)

(52) U.S. Cl.
USPC .................... 472/118; 472/119; 297/184.15

(58) Field of Classification Search
USPC ............... 472/118–125; 297/184.1, 184.11, 297/184.13, 184.15, 184.17
See application file for complete search history.

(56) References Cited

U.S. PATENT DOCUMENTS

| 3,583,734 | A | | 6/1971 | Magi |
| 3,811,715 | A | | 5/1974 | Brudy |
| 5,551,745 | A | * | 9/1996 | Huang .......................... 296/111 |
| 5,845,666 | A | | 12/1998 | Messner |
| 6,027,163 | A | * | 2/2000 | Longenecker ........... 297/184.13 |
| 6,443,522 | B1 | * | 9/2002 | Kain et al. ................ 297/184.17 |
| 8,403,767 | B2 | * | 3/2013 | Zhang ........................... 472/119 |
| 2005/0257447 | A1 | | 11/2005 | Bornemissza et al. |

FOREIGN PATENT DOCUMENTS

| DE | 19841035 A1 | 3/1999 |
| DE | 102004017099 A1 | 11/2005 |
| EP | 1839937 A1 | 10/2007 |

* cited by examiner

*Primary Examiner* — Kien Nguyen
(74) *Attorney, Agent, or Firm* — Lando & Anastasi, LLP (57) ABSTRACT

An adjustable canopy mechanism is for use in an infant carrier device having a frame unit, and includes a top cover and a pair of pivot seat units. Each pivot seat unit includes first and second pivot seats. The first pivot seat is coupled to one of the top cover and the frame unit, and has a first central pivot portion and a plurality of engaging grooves. The second pivot seat is coupled to the other one of the top cover and the frame unit, and has a second central pivot portion connected pivotally to the first central pivot portion, and a plurality of resilient arms engaging removably and respectively a subset of the engaging grooves. The second pivot seat is rotatable relative to the first pivot seat so that the resilient arms engage respectively another subset of the engaging grooves, thereby adjusting the position of the top cover relative to the frame unit.

25 Claims, 8 Drawing Sheets

ADJUSTABLE CANOPY MECHANISM AND AN INFANT CARRIER DEVICE HAVING THE SAME

CROSS-REFERENCE TO RELATED APPLICATION

This application claims priority of Chinese Application No. 201010246667.1, filed on Aug. 3, 2010.

BACKGROUND OF THE INVENTION

1. Field of the Invention

The invention relates to a canopy mechanism, more particularly to a canopy mechanism for use in an infant carrier device.

2. Description of the Related Art

An infant carrier device, such as a juvenile seat, a stroller, or an infant swing apparatus, is generally mounted with a canopy mechanism to avoid an infant seated thereon from direct exposure to the sunlight and dust. The canopy mechanism, for example, as disclosed in U.S. Pat. No. 6,170,910, U.S. Pat. No. 6,027,163, U.S. Pat. No. 6,443,522, U.S. Pat. No. 6,802,328, and U.S. Pat. No. 5,190,390, is generally operable such that the position of the canopy mechanism relative to a main body of the infant carrier device is adjustable.

SUMMARY OF THE INVENTION

The object of the present invention is to provide an adjustable canopy mechanism for use in an infant carrier device.

Another object of the present invention is to provide an infant carrier device mounted with the above mentioned adjustable canopy mechanism.

Accordingly, an adjustable canopy mechanism of the present invention is adapted for use in an infant carrier device. The infant carrier device includes frame unit that has opposite lateral sides. The adjustable canopy mechanism comprises a top cover having opposite lateral ends, and a pair of pivot seat units. Each of the pivot seat units is adapted to connect a respective one of the lateral ends of the top cover to a respective one of the lateral sides of the frame unit, and includes first and second pivot seats. The first pivot seat has a first seat body that is coupled to one of the respective one of the lateral ends of the top cover and the respective one of the lateral sides of the frame unit, and that has a first central pivot portion and a plurality of engaging grooves arranged angularly about the first central pivot portion. The second pivot seat has a second seat body that is coupled to the other one of the respective one of the lateral ends of the top cover and the respective one of the lateral sides of the frame unit, and that has a second central pivot portion connected pivotally to the first central pivot portion of the first pivot seat, and a plurality of resilient arms engaging removably and respectively a subset of the engaging grooves that correspond in number to the resilient arms. The second pivot seat is rotatable relative to the first pivot seat for a predetermined angle so that the resilient arms engage respectively another subset of the engaging grooves corresponding in number to the resilient arms, thereby adjusting the position of the top cover relative to the frame unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
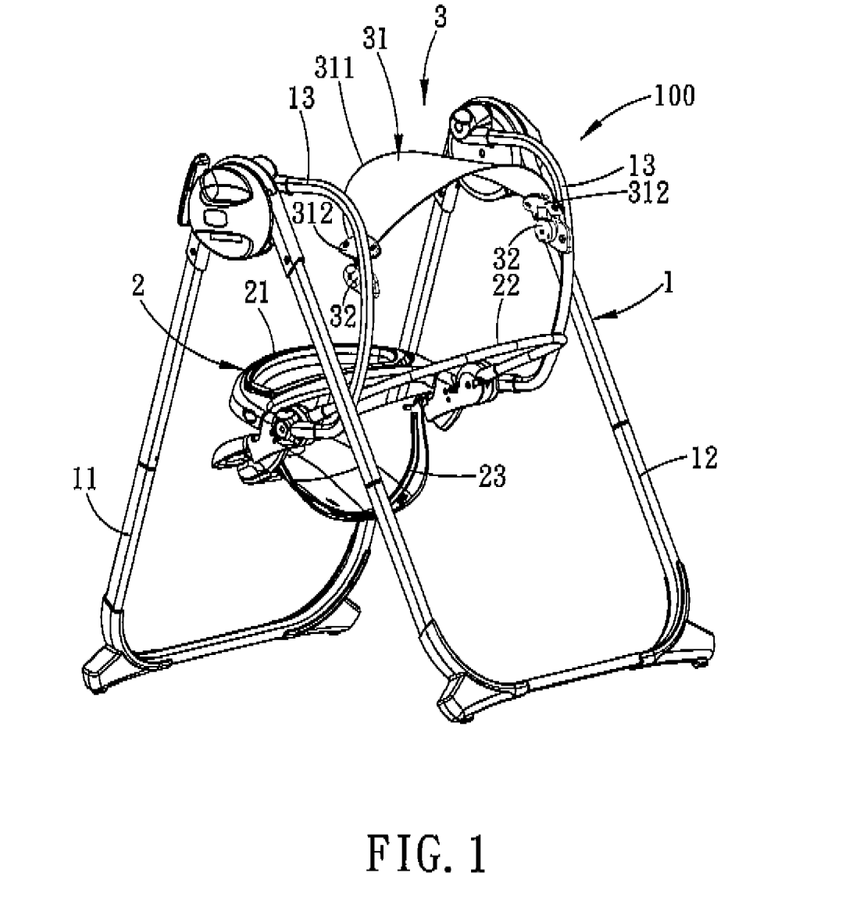
FIG. 1 is a perspective view of an infant carrier device mounted with a preferred embodiment of an adjustable canopy mechanism according to the invention.
Figure 2:
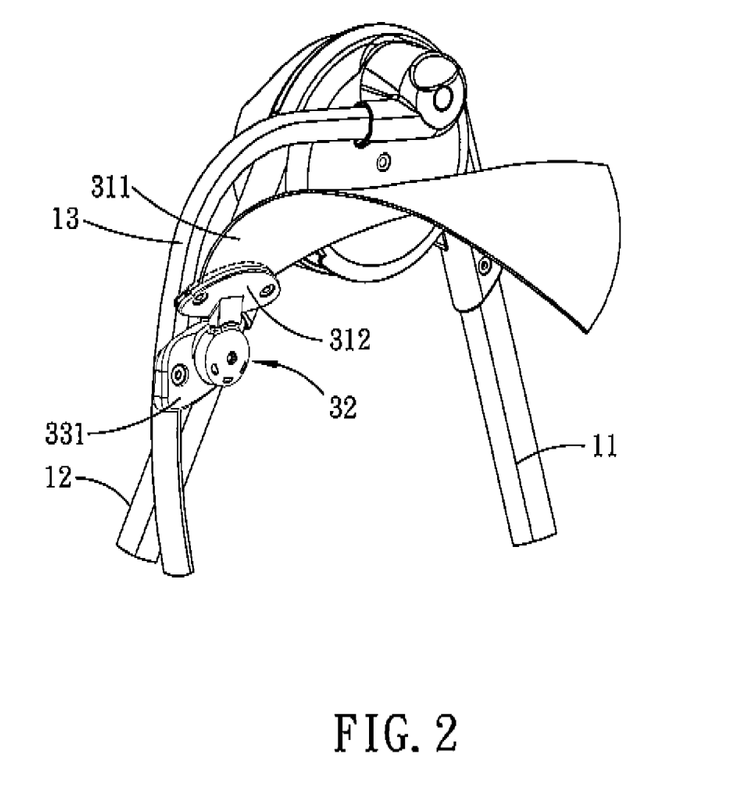
FIG. 2 is an enlarged fragmentary perspective view of the preferred embodiment.

As shown in FIGS. 1 and 2, the preferred embodiment of an adjustable canopy mechanism 3 according to the present invention is adapted for use in an infant carrier device 100, such as an infant swing apparatus. The infant carrier device 100 includes a frame unit 1 and a seat unit 2. The frame unit 1 includes a U-shaped front supporting leg 11 and a U-shaped rear supporting leg 12. Each of the front and rear supporting legs 11, 12 has opposite lateral leg segments and a bottom leg segments interconnecting bottom ends of the lateral leg segment. Top ends of the lateral leg segments of the front supporting leg 11 are connected pivotally and respectively to top ends of the lateral leg segments of the rear supporting leg 12. The bottom leg segments of the front and rear supporting legs 11, 12 are spaced apart from each other when the infant carrier device 100 is in use so that the frame unit 1 can stand stably on a supporting surface, such as the ground. The frame unit 1 further includes a pair of swing arms 13. Top ends of the swing arms 13 are connected pivotally and respectively to pivot joints of the front and rear supporting legs 11, 12, while bottom ends of the swing arms 13 are connected pivotally and respectively to opposite lateral sides of the seat unit 2, such that the seat unit 2 is swingable in a front-rear direction relative to the front and rear supporting legs 11, 12 through the swing arms 13.

The seat unit 2 includes a dish tray 21, a backrest supporting tube 22 connected to a rear side of the dish tray 21, and a seat plate 23 connected to and disposed below the dish tray 21, such that an infant may sit on the seat plate 23 with his torso being surrounded by the dish tray 21 and the backrest supporting tube 22.

Figure 3:
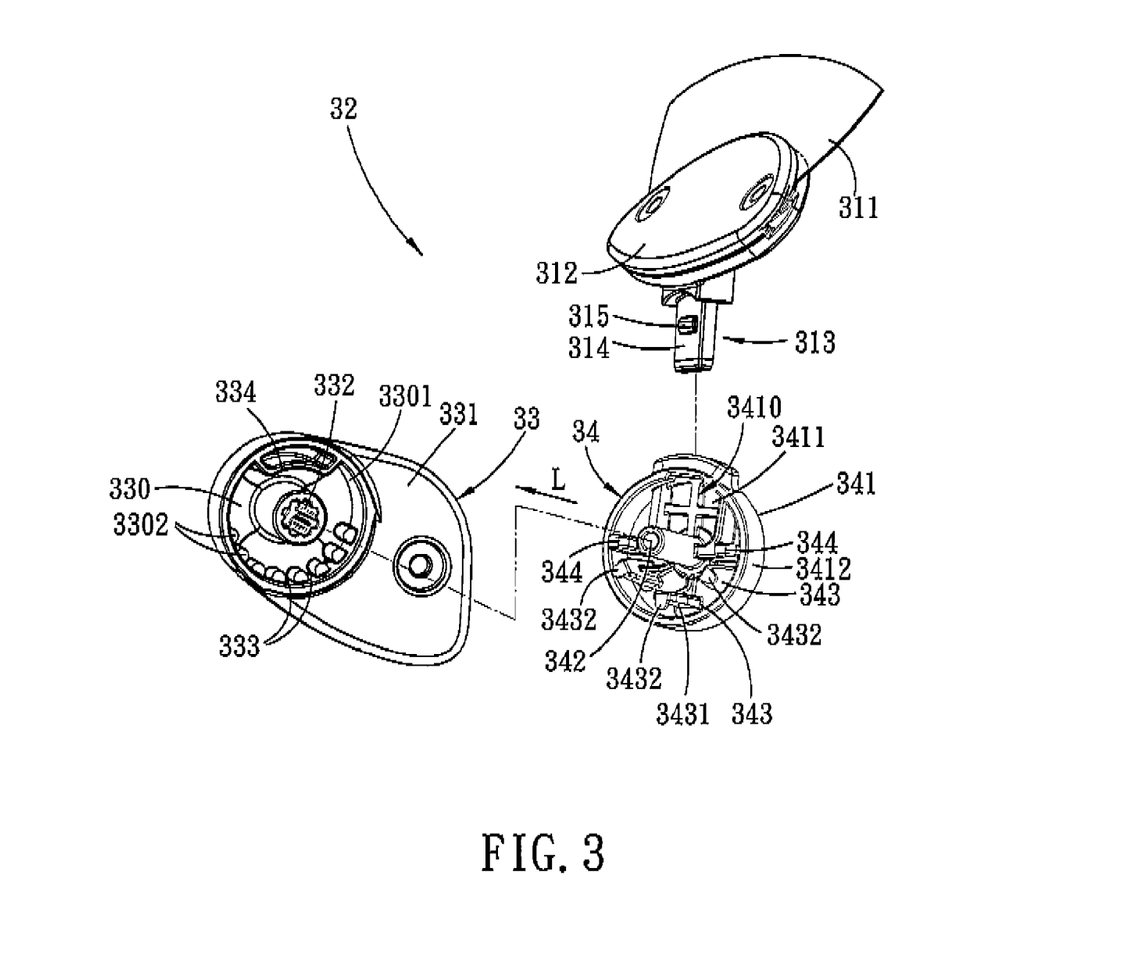
FIG. 3 is a fragmentary exploded perspective view of the preferred embodiment.
Figure 4:
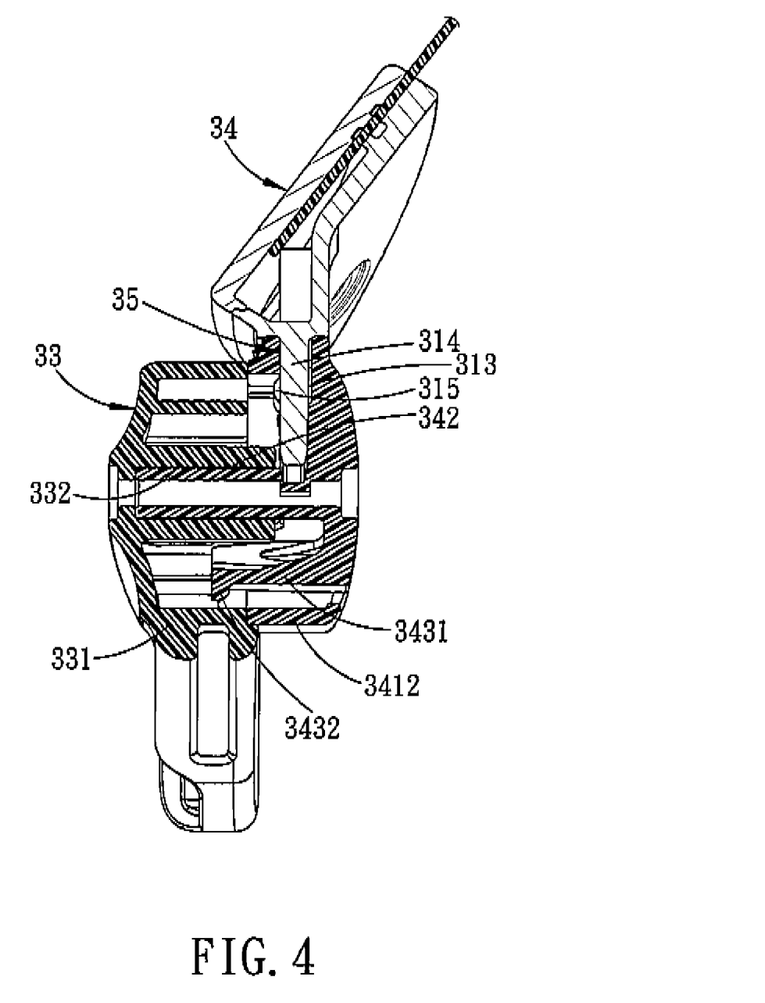
FIG. 4 is a fragmentary sectional view of the preferred embodiment.

The canopy mechanism 3 includes a top cover 31 and a pair of pivot seat units 32. The top cover 31 includes a flat cover body 311 and a pair of securing seats 312 coupled respectively to opposite lateral ends of the cover body 311. As further shown in FIGS. 3 and 4, the top cover 31 further includes a pair of insert pins 313 formed respectively at the securing seats 312 and configured respectively as opposite lateral ends of the top cover 31. Each of the insert pins 313 has a pin body 314 and a stop projection 315 protruding from the pin body 314.

Figure 5:
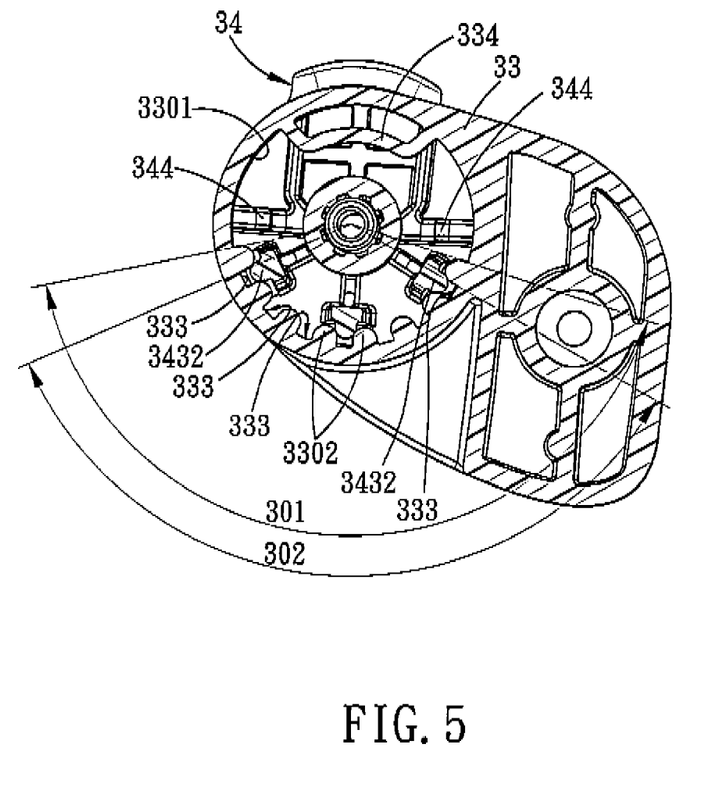
FIG. 5 is a sectional view of a pivot seat unit of the preferred embodiment.

As further shown in FIG. 5, each of the pivot seat units 32 includes a first pivot seat 33 and a second pivot seat 34 coupled rotatably to each other. In this embodiment, for each of the pivot seat units 32, the first pivot seat 33 has a first seat body 331 coupled to a respective one of the swing arms 13. The first seat body 331 has a side surface opposite to the respective one of the swing arms 13 and formed with a first round space 330, an inner surrounding surface 3301 confronting the first round space 330 (i.e., the inner surrounding surface 3301 defines the first round space 330), and a tubular first central pivot portion 332 located in a center of the first round space 330 and defining a tubular hole therein that extends through the first seat body 331. The first seat body 331 further has a plurality of spaced-apart protrusions 3302 formed on the inner surrounding surface 3301 and arranged angularly about the first central pivot portion 332, and a plurality of engaging grooves 333, each of which is defined between an adjacent pair of the protrusions 3302. The engaging grooves 333 are located in an imaginary first angular section 301 (see FIG. 5) of the first round space 330. The first seat body 331 further has a first stop block 334 formed on the inner surrounding surface 3301 and disposed in the first round space 330 at a position outside the first angular section 301. In this embodiment, the set of protrusions 3302 and the first stop block 334 are formed at circumferentially opposite positions of the inner surrounding surface 3301, and the first stop block 334 is formed as a curved plate with opposite edges connected to the inner surrounding surface 3301 (see FIG. 3).

For each pivot seat unit 32, the second pivot seat 34 includes a second seat body 341 that has a base wall 3411, an annular surrounding wall 3412 extending from a periphery of the base wall 3411 in a transverse direction (L) (see FIG. 3) and cooperating with the base wall 3411 to define a second round space 3410 that is in spatial communication with the first round space 330 of the first seat body 331 of the first pivot seat 33, and a tubular second central pivot portion 342 located in a center of the second round space 3410. The second seat body 341 further has a plurality of spaced-apart resilient arms 343 and a pair of second stop blocks 344. The resilient arms 343 are located in an imaginary second angular section 302 (see FIG. 5) of the second round space 3410 and are disposed equiangularly about the second central pivot portion 342. Each of the resilient arms 343 has a main portion 3431 that has length in the transverse direction (L) longer than that of the annular surrounding wall 3412 and that extends into the first round space 330 of the first seat body 331 of the first pivot seat 33, and a tooth portion 3432 that projects from a distal end of the main portion 3431 away from the second central pivot portion 342 and that has a substantially hemispherical profile. The second stop blocks 344 are disposed in the second round space 3410 outside the second angular section 302, located adjacent respectively to opposite sides of the second angular section, and extend in the transverse direction (L) into the first round space 330 of the first seat body 331 of the first pivot seat 33. In addition, the annular surrounding wall 3412 has a sector corresponding to the second angular section 302 of the second round space 3410, and is formed with a pin hole 35 (see FIG. 4) at a position outside the sector that is in spatial communication with the second round space 3410. The insert pins 313 of the securing seats 312 of the top cover 31 are inserted removably and respectively into the pin holes 35 of the second pivot seats 34, such that each of the pivot seat units 32 connects a corresponding one of the swing arms 13 to a corresponding one of the lateral ends (i.e., the insert pins 313). The stop projections 315 of the insert pins 313 are stopped by the inner surrounding surfaces of the annular surrounding walls 3912 of the second seat bodies 341 when the insert pins 313 are inserted into the pin holes 35 of the second pivot seats 34 so as to prevent accidental removal of the insert pins 313 from the pin holes 35, while a user still can easily pull the stop projections 315 to be disengaged from the annular surrounding walls 3412 when the top cover 31 is required to be removed from the pivot seat unit 32.

The second central pivot portion 342 of the second pivot seat 34 is inserted rotatably into the first central pivot portion 332 of the first seat body 33, and the tooth portions 3432 of the resilient arms 343 engage removably and respectively a subset of the engaging grooves 333 of the first seat body 331 of the first pivot seat 33 that correspond in number to the tooth portions 3432 of the resilient arms 343, so that the cover body 311 of the top cover 31 is positioned relative to the frame unit 1.

In use, when the user exerts a force to move the cover body 311 of the top cover 31 forwardly or rearwardly relative to the frame unit 1, the force drives the tooth portions 3432 of the resilient arms 343 of the pivot seat units 33 to be disengaged from the subset of the engaging grooves 333 of the pivot seat units 32, so that the second pivot seat 34 is permitted to pivot relative to the first pivot seat 33 for a predetermined angle until the tooth portions 3432 of the resilient arms 343 engage respectively another subset of the engaging grooves 333 corresponding in number to the tooth portions 3432 of the resilient arms 343, thereby positioning the cover body 311 at an adjusted position relative to the frame unit 1. For each pivot seat unit 32, by virtue of the first and second stop blocks 334, 344, the second pivot seat 34 is pivotable relative to the first pivot seat 33 until one of the second stop blocks 344 abuts against the first stop block 334 such that the degree of rotation of the second pivot seat 34 relative to the first pivot seat 33 is limited. In this embodiment, the configurations of the resilient arms 343 and the second stop blocks 344 for each second pivot seat 34 allow the cover body 311 to be displaced among three different positions relative to the frame unit 1, but the configurations of the resilient arms 343 and the second stop blocks 344 should not be limited thereto. Moreover, the first and second angular sections 301, 302 are configured to be smaller than 180 degrees in this embodiment, but may vary in other embodiments of this invention as long as the first and second stop blocks 334, 344 can be formed in the first and second round spaces 330, 3410 as well.

Figure 6:
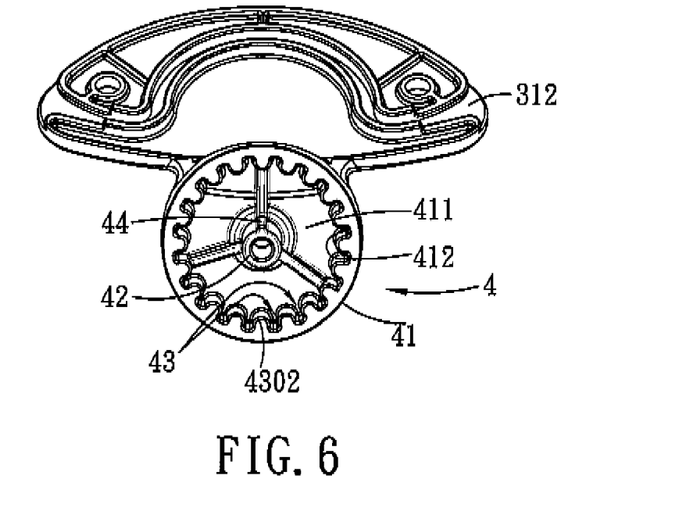
FIG. 6 is a perspective view of a modified first pivot seat of the pivot seat unit.
Figure 7:
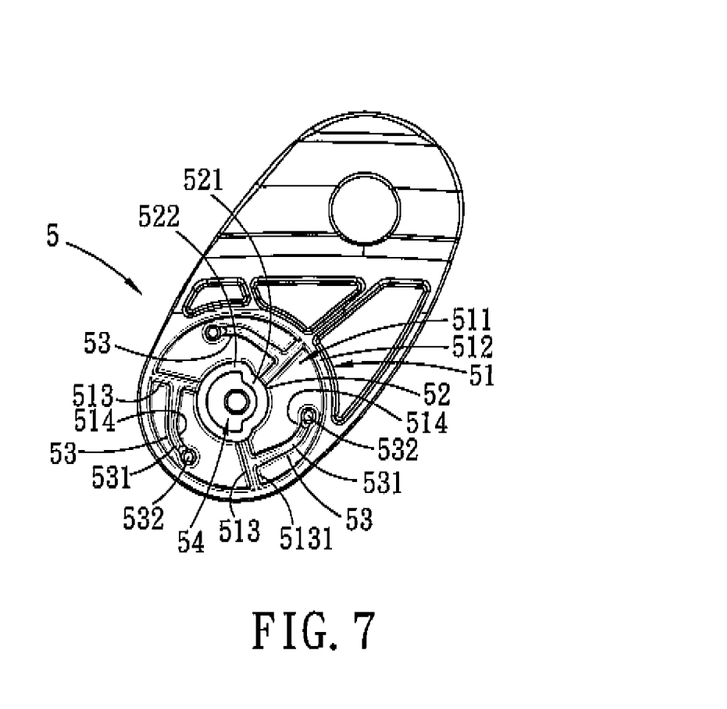
FIG. 7 is a side view of a modified second pivot seat of the pivot seat unit.
Figure 8:
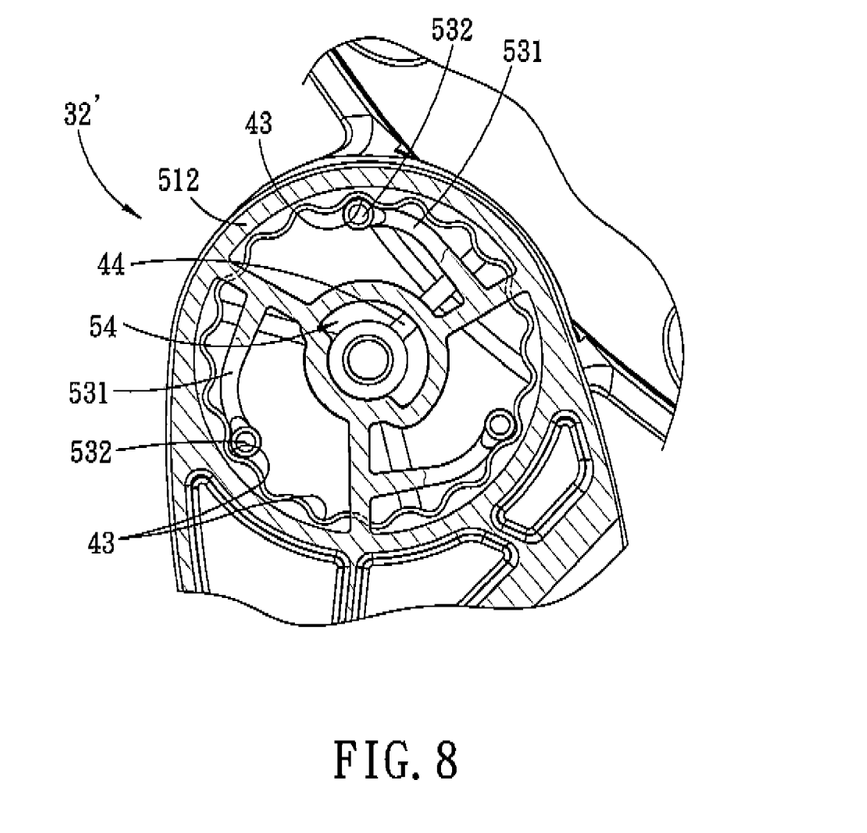
FIG. 8 is a fragmentary sectional view of a modified pivot seat unit including the modified first pivot seat illustrated in FIG. 6 and the modified second pivot seat illustrated in FIG. 7.

FIGS. 6 to 8 illustrate modified first pivot seat 4 and second pivot seat 5 of each of the pivot seat units 32'. The modified first pivot seat 4 has a first seat body 41 that has a side connected integrally to a respective one of the securing seats 312, an opposite side formed with a first round space 411, an inner surrounding surface 412 confronting the first round space 411, and a tubular first central pivot portion 42 located in a center of the first round space 411 and formed with a limit member 44. The first seat body 41 further has a plurality of spaced-apart protrusions 4302 formed on the inner surrounding surface 412 and surrounding the first central pivot portion 42, and a plurality of engaging grooves 43, each of which is defined between an adjacent pair of the protrusions 4302.

The modified second pivot seat 5 includes a second seat body 51 that has a base wall 511, an annular surrounding wall 512 extending from a periphery of the base wall 511, and a tubular second central pivot portion 52 located in a center of the base wall 511 and formed with a limit groove 54. The first central pivot portion 42 of the first pivot seat 4 is inserted rotatably into the second central pivot portion 52 with the limit member 44 thereof engaging movably the limit groove 54. The second central pivot portion 52 has a curved first wall segment 521 that has circumferentially opposite edges, and a curved second wall segment 522 that has a radius larger than that of the first wall segment 521 and that has circumferentially opposite edges connected respectively to the circumferentially opposite edges of the first wall segment 521 to define the limit groove 54. The second seat body 51 further has a plurality of angularly spaced-apart connecting ribs 513 formed on the base wall 511, extending radially, and having opposite ends that are connected respectively to the annular surrounding wall 512 and the second central pivot portion 52. The second seat body 51 further has a plurality of resilient arms 53, each of which has a curved main portion 531 extending from a side surface 5131 of a respective one of the connecting ribs 513, and an engaging portion 532 projecting from a distal end of the main portion 531 into the first round space 411 of the first pivot seat 4 and engaging removably one of the engaging grooves 43. The base wall 511 is formed with a plurality of receiving grooves 514 that receive respectively the resilient arms 53, so that the resilient arms 53 are resiliently and radially deformable. The modified second pivot seat 5 for each of the pivot seat units 32' is configured to be secured to a respective one of the swing arms 13 of the frame unit 1 (as illustrated in FIG. 2), so that the first pivot seat 9 is rotatable relative to the second pivot seat 5.

In use, when the first pivot seat 4 is rotated relative to the second pivot seat 5, the engaging portions 532 of the resilient arms 53 are driven to be disengaged respectively from a subset of the engaging grooves 43 corresponding in number to the resilient arms 53 and engage respectively another subset of the engaging grooves 43 corresponding in number to the resilient arms 53, thereby adjusting the position of the top cover 31 (as illustrated in FIG. 1). By virtue of the limit member 44 and the limit groove 54, the first pivot seat 4 is rotatable relative to the second pivot seat 5 until the limit member 44 abuts against an end of the limit groove 54, such that the degree of rotation of the first pivot seat 4 relative to the second pivot seat 5 is limited.

Figure 9:
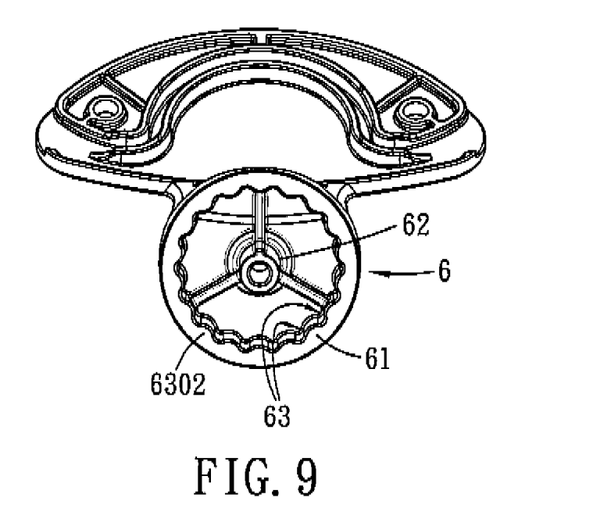
FIG. 9 is a perspective view of another modified first pivot seat of the pivot seat unit.
Figure 10:
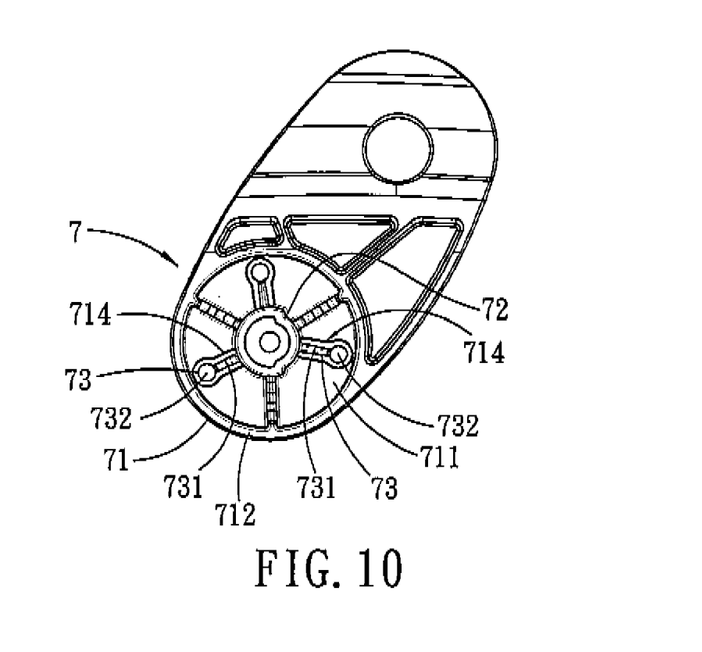
FIG. 10 is a side view another modified second pivot seat of the pivot seat unit.

FIGS. 9 and 10 illustrate another modified first pivot seat 6 and second pivot seat 7. The modified first pivot seat 6 is structurally similar to the modified first pivot seat 4 that is illustrated in FIG. 6, and has a first seat body 61 having a tubular first central pivot portion 62, a plurality of protrusions 6302 that surround the first central pivot portion 62, and a plurality of engaging grooves 63. Each of the engaging grooves 63 is defined between an adjacent pair of the protrusions 6302.

The second pivot seat 7 includes a second seat body 71 having a base wall 711, an annular surrounding wall 712 extending from a periphery of the base wall 711, a tubular second central pivot portion 72 located in a center of the base wall 711, and a plurality of angularly spaced-apart resilient arms 73 connected to and surrounding the second central pivot portion 72. Each of the resilient arms 73 has a main portion 731 extending radially from the second central pivot portion 72, and an engaging portion 732 projecting from a distal end of the main portion 731 into the first round space 411 of the first pivot seat 6, engaging removably one of the engaging grooves 63, and spaced apart from the annular surrounding wall 712. The base wall 711 is formed with a plurality of receiving grooves 714 that receive respectively the resilient arms 73, so that the resilient arms 73 are resiliently and radially deformable. The modified first and second pivot seats 6, 7 operate in the same manner as the abovementioned modified first and second pivot seats 4, 5.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An adjustable canopy mechanism adapted for use in an infant carrier device, the infant carrier device including a frame unit that has opposite lateral sides, said adjustable canopy mechanism comprising:
   a top cover having opposite lateral ends; and
   a pair of pivot seat units, each of which is adapted to connect a respective one of said lateral ends of said top cover to a respective one of the lateral sides of the frame unit, and includes
      a first pivot seat having a first seat body that is coupled to one of the respective one of said lateral ends of said top cover and the respective one of the lateral sides of the frame unit, and that has a first central pivot portion and a plurality of engaging grooves arranged angularly about said first central pivot portion, and
      a second pivot seat having a second seat body that is coupled to the other one of the respective one of said lateral ends of said top cover and the respective one of the lateral sides of the frame unit, and that has a second central pivot portion connected rotatably to said first central pivot portion of said first pivot seat, and a plurality of resilient arms engaging removably and respectively a subset of said engaging grooves that correspond in number to said resilient arms;
   wherein said second pivot seat is rotatable relative to said first pivot seat for a predetermined angle so that said resilient arms engage respectively another subset of said engaging grooves corresponding in number to said resilient arms, thereby adjusting the position of said top cover relative to the frame unit;
   wherein said first seat body of said first pivot seat of each of said pivot seat units further has a first round space and an inner surrounding surface that confronts said first round space and that is formed with said engaging grooves, said first central pivot portion of said first pivot seat of each of said pivot seat units being located in a center of said first round space of said first pivot seat of a corresponding one of said pivot seat units; and
   wherein said first seat body of said first pivot seat of each of said pivot seat units further has a plurality of protrusions formed on said inner surrounding surface, each of said engaging grooves of said first pivot seat of each of said pivot seat units being defined between an adjacent pair of said protrusions of said first pivot seat of a corresponding one of said pivot seat units.

2. An adjustable canopy mechanism adapted for use in an infant carrier device, the infant carrier device including a frame unit that has opposite lateral sides, said adjustable canopy mechanism comprising:
   a top cover having opposite lateral ends; and
   a pair of pivot seat units, each of which is adapted to connect a respective one of said lateral ends of said top cover to a respective one of the lateral sides of the frame unit, and includes
      a first pivot seat having a first seat body that is coupled to one of the respective one of said lateral ends of said top cover and the respective one of the lateral sides of the frame unit, and that has a first central pivot portion and a plurality of engaging grooves arranged angularly about said first central pivot portion, and
      a second pivot seat having a second seat body that is coupled to the other one of the respective one of said lateral ends of said top cover and the respective one of the lateral sides of the frame unit, and that has a second central pivot portion connected rotatably to said first central pivot portion of said first pivot seat, and a plurality of resilient arms engaging removably and respectively a subset of said engaging grooves that correspond in number to said resilient arms;

wherein said second pivot seat is rotatable relative to said first pivot seat for a predetermined angle so that said resilient arms engage respectively another subset of said engaging grooves corresponding in number to said resilient arms, thereby adjusting the position of said top cover relative to the frame unit;

wherein said first seat body of said first pivot seat of each of said pivot seat units further has a first round space and an inner surrounding surface that confronts said first round space and that is formed with said engaging grooves, said first central pivot portion of said first pivot seat of each of said pivot seat units being located in a center of said first round space of said first pivot seat of a corresponding one of said pivot seat units; and wherein said second seat body of each of said pivot seat units includes a base wall and an annular surrounding wall extending from a periphery of said base wall in a transverse direction and cooperating with said base wall to define a second round space, said second central pivot portion of said second pivot seat of each of said pivot seat units being located in a center of said second round space of said second pivot seat of a corresponding one of said pivot seat units, each of said resilient arms of said second pivot seat of each of said pivot seat units extending from said base wall of said second pivot seat of a corresponding one of said pivot seat units and having a length in the transverse direction longer than that of said annular surrounding wall of said second pivot seat of a corresponding one of said pivot seat units.

3. The adjustable canopy mechanism as claimed in claim 2, wherein:

said first round space in said first seat body of said first pivot seat of each of said pivot seat units is in spatial communication with said second round space of said second pivot seat of a corresponding one of said pivot seat units; and each of said resilient arms of said second pivot seat of each of said pivot seat units has a main portion extending from said base wall of said second pivot seat of a corresponding one of said pivot seat units in the transverse direction into said first round space of said first pivot seat of the corresponding one of said pivot seat units, and a tooth portion projecting from a distal end of said main portion away from said second central pivot portion of said second pivot seat of the corresponding one of said pivot seat units and engaging one of said engaging grooves of said first pivot seat of the corresponding one of said pivot seat units.

4. The adjustable canopy mechanism as claimed in claim 3, wherein said tooth portion of each of said resilient arms has a substantially hemispherical profile.

5. The adjustable canopy mechanism as claimed in claim 2, wherein:

said engaging grooves of said first seat body of each of said pivot seat units are located in an imaginary first angular section of said first round space of said first seat body of a corresponding one of said pivot seat units;

said first seat body of said first pivot seat of each of said pivot seat units further has a first stop block disposed in said first round space of said first seat body of the corresponding one of said pivot seat units at a position outside said first angular section;

said resilient arms of said second pivot seat of each of said pivot seat units are located in an imaginary second angular section of said second round space of said second seat body of a corresponding one of said pivot seat units; and said second seat body of said second pivot seat of each of said pivot seat units further has a pair of second stop blocks disposed in said second round space of said second pivot seat of a corresponding one of said pivot seat units outside said second angular section, located adjacent respectively to opposite sides of said second angular section, and extending in the transverse direction into said first round space of said first seat body of a corresponding one of said pivot seat units, said second pivot seat of each of said pivot seat units being rotatable relative to said first pivot seat of a corresponding one of said pivot seat units until one of said second stop blocks abuts against said first stop block such that the degree of rotation of said second pivot seat relative to said first pivot seat is limited.

6. The adjustable canopy mechanism as claimed in claim 5, wherein:

said annular surrounding wall of said second pivot seat of each of said pivot seat units has a sector corresponding to said second angular section of said second round space of said second pivot seat of a corresponding one of said pivot seat units;

said annular surrounding wall of said second pivot seat of each of said pivot seat units is formed with a pin hole at a position outside said sector thereof; and said top cover includes a pair of insert pins connected to opposite lateral ends thereof and inserted removably and respectively into said pin holes of said pivot seat units.

7. The adjustable canopy mechanism as claimed in claim 6, wherein said top cover further includes a flat cover body, and a pair of securing seats coupled respectively to opposite lateral ends of said cover body and formed respectively with said insert pins.

8. An adjustable canopy mechanism adapted for use in an infant carrier device, the infant carrier device including a frame unit that has opposite lateral sides, said adjustable canopy mechanism comprising:

a top cover having opposite lateral ends; and a pair of pivot seat units, each of which is adapted to connect a respective one of said lateral ends of said top cover to a respective one of the lateral sides of the frame unit, and includes a first pivot seat having a first seat body that is coupled to one of the respective one of said lateral ends of said top cover and the respective one of the lateral sides of the frame unit, and that has a first central pivot portion and a plurality of engaging grooves arranged angularly about said first central pivot portion, and a second pivot seat having a second seat body that is coupled to the other one of the respective one of said lateral ends of said top cover and the respective one of the lateral sides of the frame unit, and that has a second central pivot portion connected rotatably to said first central pivot portion of said first pivot seat, and a plurality of resilient arms engaging removably and respectively a subset of said engaging grooves that correspond in number to said resilient arms;

wherein said second pivot seat is rotatable relative to said first pivot seat for a predetermined angle so that said resilient arms engage respectively another subset of said engaging grooves corresponding in number to said resilient arms, thereby adjusting the position of said top cover relative to the frame unit;

wherein said resilient arms of said second pivot seat of each of said pivot seat units are disposed equiangularly about said second central pivot portion of said second pivot seat of a corresponding one of said pivot seat units;

wherein said second seat body of each of said pivot seat units includes a base wall and an annular surrounding wall extending from a periphery of said base wall;

wherein said second central pivot portion of said second pivot seat of each of said pivot seat units is located in a center of said base wall of said second pivot seat of a corresponding one of said pivot seat units; and wherein each of said resilient arms of said second pivot seat of each of said pivot seat units has a main portion extending radially from said second central pivot portion of said second pivot seat of a corresponding one of said pivot seat units, and an engaging portion projecting from a distal end of said main portion away from said base wall of said second pivot seat of the corresponding one of said pivot seat units.

9. The adjustable canopy mechanism as claimed in claim 8, wherein said base wall of said second pivot seat of each of said pivot seat units is formed with a plurality of receiving grooves that receive resiliently and respectively said resilient arms of said second pivot seat of a corresponding one of said pivot seat units.

10. An adjustable canopy mechanism adapted for use in an infant carrier device, the infant carrier device including a frame unit that has opposite lateral sides, said adjustable canopy mechanism comprising:

a top cover having opposite lateral ends; and
a pair of pivot seat units, each of which is adapted to connect a respective one of said lateral ends of said top cover to a respective one of the lateral sides of the frame unit, and includes
   a first pivot seat having a first seat body that is coupled to one of the respective one of said lateral ends of said top cover and the respective one of the lateral sides of the frame unit, and that has a first central pivot portion and a plurality of engaging grooves arranged angularly about said first central pivot portion, and
   a second pivot seat having a second seat body that is coupled to the other one of the respective one of said lateral ends of said top cover and the respective one of the lateral sides of the frame unit, and that has a second central pivot portion connected rotatably to said first central pivot portion of said first pivot seat, and a plurality of resilient arms engaging removably and respectively a subset of said engaging grooves that correspond in number to said resilient arms;
wherein said second pivot seat is rotatable relative to said first pivot seat for a predetermined angle so that said resilient arms engage respectively another subset of said engaging grooves corresponding in number to said resilient arms, thereby adjusting the position of said top cover relative to the frame unit;
wherein said resilient arms of said second pivot seat of each of said pivot seat units are disposed equiangularly about said second central pivot portion of said second pivot seat of a corresponding one of said pivot seat units;
wherein said second seat body of each of said pivot sea t units includes a base wall, an annular surrounding wall extending from a periphery of said base wall, and a plurality of angularly spaced-apart connecting ribs formed on said base wall and extending radially;
wherein said second central pivot portion of said second pivot seat of each of said pivot seat units is located in a center of said base wall of said second pivot seat of a corresponding one of said pivot seat units; and
wherein each of said resilient arms of said second pivot seat of each of said pivot seat units has
   a main portion extending from a side surface of a respective one of said connecting ribs of said second pivot seat of a corresponding one of said pivot seat units that is between radially opposite ends of the respective one of said connecting ribs, and
   an engaging portion projecting from a distal end of said main portion.

11. The adjustable canopy mechanism as claimed in claim 10, wherein said radially opposite ends of said connecting ribs of said second seat body of said second pivot seat of each of said pivot seat units are connected respectively to said annular surrounding wall and said second central pivot portion of said second pivot seat of a corresponding one of said pivot seat units.

12. An adjustable canopy mechanism adapted for use in an infant carrier device, the infant carrier device including a frame unit that has opposite lateral sides, said adjustable canopy mechanism comprising:

a top cover having opposite lateral ends; and
a pair of pivot seat units, each of which is adapted to connect a respective one of said lateral ends of said top cover to a respective one of the lateral sides of the frame unit, and includes
   a first pivot seat having a first seat body that is coupled to one of the respective one of said lateral ends of said top cover and the respective one of the lateral sides of the frame unit, and that has a first central pivot portion and a plurality of engaging grooves arranged angularly about said first central pivot portion, and
   a second pivot seat having a second seat body that is coupled to the other one of the respective one of said lateral ends of said top cover and the respective one of the lateral sides of the frame unit, and that has a second central pivot portion connected rotatably to said first central pivot portion of said first pivot seat, and a plurality of resilient arms engaging removably and respectively a subset of said engaging grooves that correspond in number to said resilient arms;
wherein said second pivot seat is rotatable relative to said first pivot seat for a predetermined angle so that said resilient arms engage respectively another subset of said engaging grooves corresponding in number to said resilient arms, thereby adjusting the position of said top cover relative to the frame unit;
wherein one of said first and second central pivot portions of each of said pivot seat units is formed with a limit groove;
wherein the other one of said first and second central pivot portions of each of said pivot seat units has a limit member engaging movably said limit groove of a corresponding one of said pivot seat units; and
wherein said first pivot seat of each of said pivot seat units is rotatable relative to said second pivot seat of a corresponding one of said pivot seat units until said limit member abuts against an end of said limit groove thereby limiting the degree of rotation of said second pivot seat relative to said first pivot seat.

13. The adjustable canopy mechanism as claimed in claim 12, wherein:

said second central pivot portion of said second pivot seat of each of said pivot seat units is tubular and has a curved first wall segment that has circumferentially opposite edges and a curved second wall segment that has a radius larger than that of said first wall segment and that has circumferentially opposite edges connected respectively to said circumferentially opposite edges of said first wall segment to define said limit groove; and said first central pivot portion of said first pivot seat of each of said pivot seat units is tubular and inserted rotatably into said second central pivot portion of said second pivot seat of a corresponding one of said pivot seat units.

14. An infant carrier device comprising a frame unit having opposite lateral sides, a seat unit mounted to said frame unit, and an adjustable canopy mechanism including:
a top cover that has opposite lateral ends; and
a pair of pivot seat units, each of which connects a respective one of said lateral ends of said top cover to a respective one of said lateral sides of said frame unit, and includes
a first pivot seat having a first seat body that is coupled to one of the respective one of said lateral ends of said top cover and the respective one of said lateral sides of said frame unit, and that has a first central pivot portion and a plurality of engaging grooves arranged angularly about said first central pivot portion, and
a second pivot seat having a second seat body that is coupled to the other one of the respective one of said lateral ends of said top cover and the respective one of said lateral sides of said frame unit, and that has a second central pivot portion connected rotatably to said first central pivot portion of said first pivot seat, and a plurality of resilient arms engaging removably and respectively a subset of said engaging grooves that correspond in number to said resilient arms;
wherein said second pivot seat is rotatable relative to said first pivot seat for a predetermined angle so that said resilient arms engage respectively another subset of said engaging grooves corresponding in number to said resilient arms, thereby adjusting the position of said top cover relative to said frame unit;
wherein said first seat body of said first pivot seat of each of said pivot seat units further has a first round space and an inner surrounding surface that confronts said first round space and that is formed with said engaging grooves, said first central pivot portion of said first pivot seat of each of said pivot seat units being located in a center of said first round space of said first pivot seat of a corresponding one of said pivot seat units; and
wherein said second seat body of each of said pivot seat units includes a base wall and an annular surrounding wall extending from a periphery of said base wall in a transverse direction and cooperating with said base wall to define a second round space, said second central pivot portion of said second pivot seat of each of said pivot seat units being located in a center of said second round space of said second pivot seat of a corresponding one of said pivot seat units, each of said resilient arms of said second pivot seat of each of said pivot seat units extending from said base wall of said second pivot seat of a corresponding one of said pivot seat units and having a length in the transverse direction longer than that of said annular surrounding wall of said second pivot seat of a corresponding one of said pivot seat units.

15. The infant carrier device as claimed in claim 14, wherein:

said first round space in said first seat body of said first pivot seat of each of said pivot seat units is in spatial communication with said second round space of said second pivot seat of a corresponding one of said pivot seat units; and
each of said resilient arms of said second pivot seat of each of said pivot seat units has
a main portion extending from said base wall of said second pivot seat of a corresponding one of said pivot seat units in the transverse direction into said first round space of said first pivot seat of the corresponding one of said pivot seat units, and
a tooth portion projecting from a distal end of said main portion away from said second central pivot portion of said second pivot seat of the corresponding one of said pivot seat units and engaging one of said engaging grooves of said first pivot seat of the corresponding one of said pivot seat units.

16. The infant carrier device as claimed in claim 15, wherein said tooth portion of each of said resilient arms has a substantially hemispherical profile.

17. The infant carrier device as claimed in claim 14, wherein:
said engaging grooves of said first seat body of each of said pivot seat units are located in an imaginary first angular section of said first round space of said first seat body of a corresponding one of said pivot seat units;
said first seat body of said first pivot seat of each of said pivot seat units further has a first stop block disposed in said first round space of said first seat body of the corresponding one of said pivot seat units at a position outside said first angular section;
said resilient arms of said second pivot seat of each of said pivot seat units are located in an imaginary second angular section of said second round space of said second seat body of a corresponding one of said pivot seat units; and
said second seat body of said second pivot seat of each of said pivot seat units further has a pair of second stop blocks disposed in said second round space of said second pivot seat of a corresponding one of said pivot seat units outside said second angular section, located adjacent respectively to opposite sides of said second angular section, and extending in the transverse direction into said first round space of said first seat body of a corresponding one of said pivot seat units, said second pivot seat of each of said pivot seat units being rotatable relative to said first pivot seat of a corresponding one of said pivot seat units until one of said second stop blocks abuts against said first stop block such that the degree of rotation of said second pivot seat relative to said first pivot seat is limited.

18. The infant carrier device as claimed in claim 17, wherein:
said annular surrounding wall of said second pivot seat of each of said pivot seat units has a sector corresponding to said second angular section of said second round space of said second pivot seat of a corresponding one of said pivot seat units;
said annular surrounding wall of said second pivot seat of each of said pivot seat units is formed with a pin hole at a position outside said sector thereof; and said top cover includes a pair of insert pins connected to opposite lateral ends thereof and inserted removably and respectively into said pin holes of said pivot seat units.

19. The infant carrier device as claimed in claim 18, wherein said top cover further includes a flat cover body, and a pair of securing seats coupled respectively to opposite lateral ends of said cover body and formed respectively with said insert pins.

20. An infant carrier device comprising a frame unit having opposite lateral sides, a seat unit mounted to said frame unit, and an adjustable canopy mechanism including:
- a top cover that has opposite lateral ends; and
- a pair of pivot seat units, each of which connects a respective one of said lateral ends of said top cover to a respective one of said lateral sides of said frame unit, and includes
  - a first pivot seat having a first seat body that is coupled to one of the respective one of said lateral ends of said top cover and the respective one of said lateral sides of said frame unit, and that has a first central pivot portion and a plurality of engaging grooves arranged angularly about said first central pivot portion, and
  - a second pivot seat having a second seat body that is coupled to the other one of the respective one of said lateral ends of said top cover and the respective one of said lateral sides of said frame unit, and that has a second central pivot portion connected rotatably to said first central pivot portion of said first pivot seat, and a plurality of resilient arms engaging removably and respectively a subset of said engaging grooves that correspond in number to said resilient arms;
- wherein said second pivot seat is rotatable relative to said first pivot seat for a predetermined angle so that said resilient arms engage respectively another subset of said engaging grooves corresponding in number to said resilient arms, thereby adjusting the position of said top cover relative to said frame unit;
- wherein said resilient arms of said second pivot seat of each of said pivot seat units are disposed equiangularly about said second central pivot portion of said second pivot seat of a corresponding one of said pivot seat units;
- wherein said second seat body of each of said pivot seat units includes a base wall and an annular surrounding wall extending from a periphery of said base wall;
- wherein said second central pivot portion of said second pivot seat of each of said pivot seat units is located in a center of said base wall of said second pivot seat of a corresponding one of said pivot seat units; and
- wherein each of said resilient arms of said second pivot seat of each of said pivot seat units has
  - a main portion extending radially from said second central pivot portion of said second pivot seat of a corresponding one of said pivot seat units, and
  - an engaging portion projecting from a distal end of said main portion away from said base wall of said second pivot seat of the corresponding one of said pivot seat units.

21. The infant carrier device as claimed in claim 20, wherein said base wall of said second pivot seat of each of said pivot seat units is formed with a plurality of receiving grooves that receive resiliently and respectively said resilient arms of said second pivot seat of a corresponding one of said pivot seat units.

22. An infant carrier device comprising a frame unit having opposite lateral sides, a seat unit mounted to said frame unit, and an adjustable canopy mechanism including:
- a top cover that has opposite lateral ends; and
- a pair of pivot seat units, each of which connects a respective one of said lateral ends of said top cover to a respective one of said lateral sides of said frame unit, and includes
  - a first pivot seat having a first seat body that is coupled to one of the respective one of said lateral ends of said top cover and the respective one of said lateral sides of said frame unit, and that has a first central pivot portion and a plurality of engaging grooves arranged angularly about said first central pivot portion, and
  - a second pivot seat having a second seat body that is coupled to the other one of the respective one of said lateral ends of said top cover and the respective one of said lateral sides of said frame unit, and that has a second central pivot portion connected rotatably to said first central pivot portion of said first pivot seat, and a plurality of resilient arms engaging removably and respectively a subset of said engaging grooves that correspond in number to said resilient arms;
- wherein said second pivot seat is rotatable relative to said first pivot seat for a predetermined angle so that said resilient arms engage respectively another subset of said engaging grooves corresponding in number to said resilient arms, thereby adjusting the position of said top cover relative to said frame unit;
- wherein said resilient arms of said second pivot seat of each of said pivot seat units are disposed equiangularly about said second central pivot portion of said second pivot seat of a corresponding one of said pivot seat units;
- wherein said second seat body of each of said pivot seat units includes a base wall, an annular surrounding wall extending from a periphery of said base wall, and a plurality of angularly spaced-apart connecting ribs formed on said base wall and extending radially;
- wherein said second central pivot portion of said second pivot seat of each of said pivot seat units is located in a center of said base wall of said second pivot seat of a corresponding one of said pivot seat units; and
- wherein each of said resilient arms of said second pivot seat of each of said pivot seat units has
  - a main portion extending from a side surface of a respective one of said connecting ribs of said second pivot seat of a corresponding one of said pivot seat units that is between radially opposite ends of the respective one of said connecting ribs, and
  - an engaging portion projecting from a distal end of said main portion.

23. The infant carrier device as claimed in claim 22, wherein said radially opposite ends of said connecting ribs of said second seat body of said second pivot seat of each of said pivot seat units are connected respectively to said annular surrounding wall and said second central pivot portion of said second pivot seat of a corresponding one of said pivot seat units.

24. An infant carrier device comprising a frame unit having opposite lateral sides, a seat unit mounted to said frame unit, and an adjustable canopy mechanism including:
- a top cover that has opposite lateral ends; and
- a pair of pivot seat units, each of which connects a respective one of said lateral ends of said top cover to a respective one of said lateral sides of said frame unit, and includes
  - a first pivot seat having a first seat body that is coupled to one of the respective one of said lateral ends of said top cover and the respective one of said lateral sides of said frame unit, and that has a first central pivot portion and a plurality of engaging grooves arranged angularly about said first central pivot portion, and
  - a second pivot seat having a second seat body that is coupled to the other one of the respective one of said lateral ends of said top cover and the respective one of said lateral sides of said frame unit, and that has a second central pivot portion connected rotatably to said first central pivot portion of said first pivot seat, and a plurality of resilient arms engaging removably and respectively a subset of said engaging grooves that correspond in number to said resilient arms;

wherein said second pivot seat is rotatable relative to said first pivot seat for a predetermined angle so that said resilient arms engage respectively another subset of said engaging grooves corresponding in number to said resilient arms, thereby adjusting the position of said top cover relative to said frame unit;

wherein one of said first and second central pivot portions of each of said pivot seat units is formed with a limit groove;

wherein the other one of said first and second central pivot portions of each of said pivot seat units has a limit member engaging movably said limit groove of a corresponding one of said pivot seat units; and wherein said first pivot seat of each of said pivot seat units is rotatable relative to said second pivot seat of a corresponding one of said pivot seat units until said limit member abuts against an end of said limit groove, thereby limiting the degree of rotation of said second pivot seat relative to said first pivot seat.

25. The infant carrier device as claimed in claim 24, wherein:

said second central pivot portion of said second pivot seat of each of said pivot seat units is tubular and has a curved first wall segment that has circumferentially opposite edges and a curved second wall segment that has a radius larger than that of said first wall segment and that has circumferentially opposite edges connected respectively to said circumferentially opposite edges of said first wall segment to define said limit groove; and said first central pivot portion of said first pivot seat of each of said pivot seat units is tubular and inserted rotatably into said second central pivot portion of said second pivot seat of a corresponding one of said pivot seat units.

* * * * *